United States Patent [19]

Ruff

[11] Patent Number: 5,207,761
[45] Date of Patent: May 4, 1993

[54] REFRIGERATOR/WATER PURIFIER WITH COMMON EVAPORATOR

[75] Inventor: John D. Ruff, Alexandria, Va.

[73] Assignee: Thermadyne, Inc., Alexandria, Va.

[21] Appl. No.: 876,258

[22] Filed: Apr. 30, 1992

Related U.S. Application Data

[60] Continuation-in-part of Ser. No. 864,781, Apr. 7, 1992, which is a continuation-in-part of Ser. No. 654,509, Feb. 13, 1991, Pat. No. 5,123,943, which is a continuation-in-part of Ser. No. 494,546, Mar. 16, 1990, Pat. No. 4,998,417, which is a continuation-in-part of Ser. No. 437,161, Nov. 16, 1989, Pat. No. 4,941,902, which is a division of Ser. No. 278,447, Dec. 1, 1988, Pat. No. 4,897,099.

[51] Int. Cl.$^5$ .............................. C02F 1/22
[52] U.S. Cl. .................... 62/124; 62/137; 62/186
[58] Field of Search ............... 62/123, 124, 532, 137, 62/186

[56] References Cited

U.S. PATENT DOCUMENTS

| | | | |
|---|---|---|---|
| 2,066,431 | 1/1937 | Taylor | 62/123 |
| 2,691,275 | 10/1954 | Andrews | 62/123 X |
| 2,775,100 | 12/1956 | Howe | 62/123 X |
| 3,398,805 | 8/1968 | Waller | 141/83 X |
| 3,488,974 | 1/1970 | Lunde et al. | 62/123 |
| 3,885,937 | 5/1975 | Norris | 62/137 |
| 4,262,489 | 4/1981 | Sakamoto | 62/124 |
| 4,370,865 | 2/1983 | Hibino et al. | 62/124 |
| 4,897,099 | 1/1990 | Ruff | 62/532 |

Primary Examiner—William E. Tapolcai

[57] ABSTRACT

A refrigeration system provides a supply of purified ice pieces by freezing flowing water on an icemaking plate and melting some of the ice pieces to provide a supply of purified water. The system is combined with a household refrigerator to utilize a common compressor, evaporator and condenser. Alternative arrangements are provided for defrost of the evaporator by hot gas bypass, or by electrical heating elements. Individual ice pieces can be formed separately by spacing of the contact points where the evaporator piping meets the ice-forming surface, or by dividing the ice forming surface into separate ice forming cavities, with a plastic mask.

6 Claims, 2 Drawing Sheets

REFRIGERATOR/WATER PURIFIER WITH COMMON EVAPORATOR

CROSS-REFERENCE TO RELATED APPLICATIONS

This application is a continuation-in-part of my co-pending U.S. patent application Ser. No. 07/864,781, filed Apr. 7, 1992, which is a continuation-in-part of my co-pending U.S. patent application 07/654,509 filed Feb. 13, 1991, now U.S. Pat. No. 5,123,943, which is, in turn, a continuation-in-part of my prior U.S. patent application Ser. No. 07/494,546, filed Mar. 16, 1990, now U.S. Pat. No. 4,998,417. Application Ser. No. 07/494,546 is, in turn, a continuation-in-part of my co-pending U.S. patent application Ser. No. 07/437,161 filed Nov. 16, 1989, now U.S. Pat. No. 4,941,902, which is a divisional application of my U.S. patent application Ser. No. 07/278,447, filed Dec. 1, 1988, now U.S. Pat. No. 4,897,099.

The subject matter of all of these aforesaid applications is expressly incorporated herein in its entirety.

BACKGROUND OF THE INVENTION

The present invention relates to a method and apparatus for providing purified ice pieces and purified liquid water from a source of unpurified liquid water, and the incorporation of such method and apparatus into a domestic refrigerator, while using the same compressor, condenser, evaporator and insulated cabinet for both the icemaker/water purifier system and the domestic refrigerator.

In my U.S. patent application Ser. No. 07/864,781 I disclose a method and apparatus for forming purified ice pieces from unpurified water such as tap water. The ice pieces are periodically harvested and collected in a bin, the bottom of which is heated as necessary to melt desired quantities of the ice to provide a supply of purified water. In the embodiment disclosed in FIG. 4 of my aforementioned patent application, a finned heat conductor block is used to conduct heat from an ice-making surface to the sub-freezing air in a freezer space.

In the present invention, the evaporator cooling the subfreezing air in the freezer space is placed in direct mechanical contact with the ice making surface.

OBJECTS AND SUMMARY OF THE INVENTION

It is the object of the present invention to provide a domestic refrigerator/freezer with a built-in icemaker and water purifier; and to simplify the construction of the freezer space evaporator, and the structure conducting heat from the ice forming surface to this evaporator, when it is being used in icemaking operation. These improvements provide more efficient overall operation and reduce the cost of production of the appliance.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference numerals, and wherein.

DESCRIPTION OF THE PREFERRED EMBODIMENTS

Figure 1:
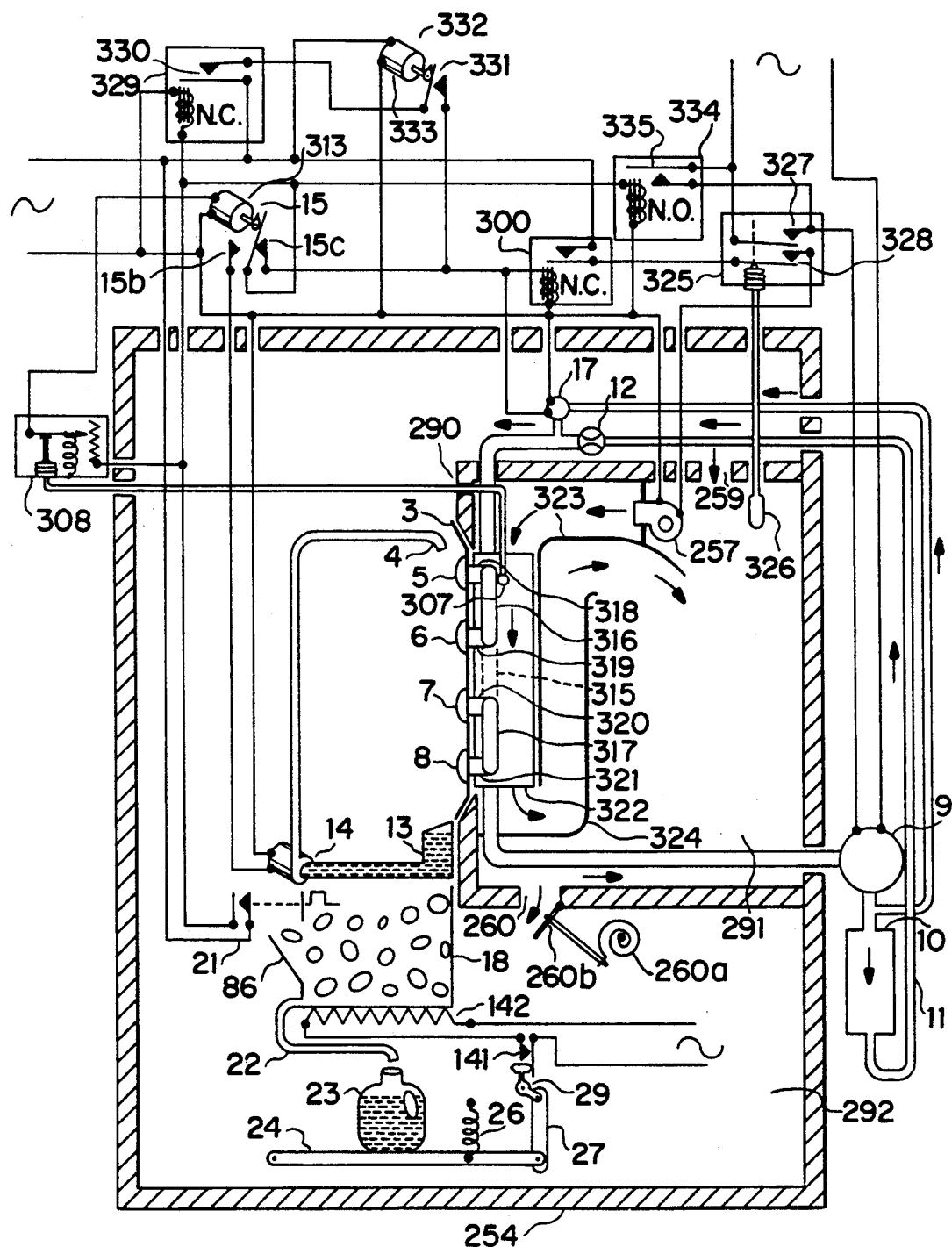
FIG. 1 is a schematic flow diagram of a system constituting one embodiment of the present invention.

In order to facilitate reference to the disclosure material incorporated herein from my U.S. Pat. No. 4,897,099 and my other above-described patent applications and issued patents, reference numerals up to and including 313 appearing in the accompanying drawings are chosen to correspond to those reference numerals employed in the aforesaid patents for like elements. Higher reference numerals appearing in the accompanying drawings designate elements not present in the aforesaid patents. In the interest of brevity, and to facilitate understanding of the subject matter of the present invention, the following description omits discussion of the portions of the system not directly related to the present invention subject matter.

Referring to FIG. 1 of the accompanying drawings, an ice maker includes an evaporator tube 315 connected to the dry or control surface of a vertical ice-forming plate 3 at multiple spaced locations. For some applications a plurality of such plates may be employed. In this embodiment, as illustrated in FIG. 1, ice forming plate 3 is shown as a flat surface. Alternatively the wet surface of this plate can be shaped with indentations or channels corresponding to the locations at which ice pieces are formed so that the ice pieces when formed, take the shape of these indentations or channels.

Plate 3 forms part of the dividing wall 290 separating freezer space 291 and refrigerator space 292, so that the side described as the wet or ice forming side of plate 3 is contacted by above-freezing air in the refrigerator space. Evaporator tube 315 is a four pass horizontal metal tube, and FIG. 1 shows a side view of this evaporator tube with return bends 316 and 317 visible. Substantial metal conductor pieces 318, 319, 320 and 321 connect evaporator tube 315 to evaporator plate 3, and during icemaking, conduct a flow of the heat removed from ice forming on plate 3, to the cold evaporator tube. Unpurified water discharged as a jet or stream from nozzle 4 flows down the wet or ice-forming surface of plate 3, whereby ice pieces 5, 6, 7 and 8 are formed at spaced areas corresponding to the locations of contact between conductor pieces 318, 319, 320 and 321 and plate 3. Refrigerant vapor from the evaporator flows back to a compressor 9 where it is compressed and then flows to condenser 10. Condensed liquid refrigerant flows via liquid line 11, through metering device 12, typically an expansion valve, then back to evaporator tube 315 in a conventional closed circuit refrigeration flow path. Excess water flowing over the growing ice pieces 5, 6, 7 and 8 carries away impurities before they can be trapped and then drains into sump 13. Water from sump 13 is drawn by pump 14 and pumped back to nozzle 4 to form a continuous circuit of unpurified water flow. A plurality of nozzles similar to nozzle 4 can be used.

After a predetermined time has elapsed for ice piece 5, 6, 7 and 8 to grow to adequate size, a harvest of ice pieces is initiated. A cam in timer 15 actuates switch points 15b to break an energizing circuit for pump 14. With pump 14 deactuated, water in transit from pump 14 to nozzle 4, and water flowing over the ice pieces, flows back to raise the level in sump 13. This activates a siphon which then dumps the remainder of the water from sump 13 to the drain. At the same time, timer 15 activates switch point 15b to deactivate pump 14, and activates switch point 15c to energize a hot gas valve 17, allowing hot refrigerant gas to be bypassed around the condenser and expansion valve and to flow directly into evaporator tube 315. The warming effect of this hot gas detaches the ice pieces from plate 3 permitting the pieces to fall into ice bin 18. Meanwhile, the water in sump 13 is replenished by tap water under the control of a float valve. After a predetermined ice piece harvest interval, the cam of timer 15 reverses the settings of the switch points, de-energizes hot gas valve 17, and reactivates pump 14 so that ice making can be resumed. A repetitive cycle of harvest and ice making is thus continued until ice bin 18 is full, at which time the ice pieces come into contact with the ice quantity sensor of bin switch 21 which opens, causing timer 15 and pump 14 to be de-energized, and ice making terminated. The ice pieces thusly collected, because they are continuously washed by the stream from nozzle 4 as they are being formed, have a much higher purity than that of the original tap water. Parts of the ice-making apparatus so far described, such as a siphon to dump remaining water from the sump, a water float valve, a timer to control ice-making time, and a hot-gas defrost harvest system, are well known examples of state-of-the-art apparatus, and alternatively, any other apparatus capable of performing similar functions can be used. Similarly, any other type of icemaker apparatus using a recirculating flow of pumped water, and thus being capable of producing a supply of pure ice pieces, can be used in this invention, in conjunction with my novel evaporator apparatus.

When supplies of solid ice pieces are required they can be removed from ice bin 18 via door 86, or a state of the art motorized ice crusher/dispenser can be used.

Any ice that melts in bin 18 drains through pipe 22 to bottle 23 resting on platform 24, thus providing a supply of purified water. When bottle 23 is less than full, its weight is overcome by the force of balance spring 26 which pulls platform 24 upwards, causing control link 27 to rotate rocker arm 29 and allowing switch 141 to close. Current flowing through switch 141 energizes electrical heating element 142 to heat the bottom of bin 18, causing ice therein to melt. When the purified water derived by melting ice has filled bottle 23 to a predetermined level, its increased weight overcomes the force of balance spring 26, allowing platform 24 and control link 27 to drop and rocker arm 29 to open switch 141, thus de-energizing heating element 142. This above described ice-melting function is described in greater detail in my above-described patent applications. Additionally, any of the other methods of ice-melting described in earlier patents can be used in the present invention. These methods include heating by air flow and the use of rejected condenser heat. As described in my earlier patents, a tank with a float switch can be used to hold the purified water and determine its quantity instead of the arrangement with bottle 23, platform 24, balance spring 26 and switch 141.

Devices other than a float switch, such as a diaphragm pressure switch, an electronic sensor, or any other suitable device can be used to detect the level of purified water in this tank, and since such a tank may be at a level inconveniently low to the floor, a pump can be used to deliver purified water at a more convenient, higher level. Also, such a pump can be used as part of a double purification method wherein a tank full of already purified water can be pumped back up to a holding tank on top of the refrigerator, to be drained back to the sump in a series of icemaking cycles. Water twice treated in this manner has a much higher degree of purification.

Throughout this patent application and my earlier referenced patents, I have referred to tap water and unpurified water. These are relative terms, since the water to be purified by my invention may not actually come from a tap or water pipe, but could be delivered by a bucket and stored in a holding tank which could be connected to my purifier system. Likewise the term unpurified should be clarified since the water which is to be purified by my system may have already been purified to some extent by a filter or some other method.

The combined refrigerator and icemaker/water purifier unit is enclosed in an insulated cabinet 254, shown with a separate freezer space 291 and refrigerator space 292. The water sump, pump, icemaking surface, ice bin and purified water container of the icemaker/water purifier described above are located in refrigerator space 292, also used for storage of food at temperatures above freezing. Evaporator fan 257 circulates air over heat exchanger fin assembly 322, attached to evaporator tube 315 in freezer space 291, with a secondary flow of air being induced through openings 259 and 260 to the higher temperature refrigerator space 292. This secondary flow arrangement is commonly used in existing refrigerators. Heat from the air propelled by fan 257 is removed by contact with heat exchanger fin assembly 322 and flows to evaporator tube 315 to which the fins are attached. Evaporator tube 315 thus cools the air in freezer space 291.

However, during icemaking, in the harvest cycle when hot gas valve 17 is activated, relay 300 is energized and its normally closed contacts open to cause fan 257 to be deactivated. This prevents the heating effect of the hot gas bypass from being opposed by a continuing flow of cold air through fin assembly 322. Baffles 323 and 324 help prevent convective flow during this time.

Double pole thermostat 325 is shown with remote sensor bulb 326 located in freezer space 291 in the manner commonly employed with domestic refrigerators using a temperature setting consistent with maintaining freezer temperatures. When the temperature at bulb 326 is higher than this setting, contacts 327 of thermostat 325 close and compressor 9 is activated; also, contacts 328 close and fan 257 is energized through the normally closed contacts of relay 300. Cooling is thus provided in freezer space 291. While in this cooling mode, should bin 18 become less than full, bin switch 21 closes and timer 15 is energized. Pump 14 is then activated and water flows over plate 3 in the icemaking function already described. In this manner, simultaneous icemaking operation and cooling of freezer space 291 is provided.

After some time operating in this simultaneous icemaking and cooling mode, should bin 18 become full, bin switch 21 opens, timer 15 is de-energized, and pump 14 is de-activated. Water then ceases to flow over ice-forming plate 3 and icemaking is terminated. At the same time that timer 15 is de-energized, relay 329 is also de-energized and its normally closed contacts 330 close to switch voltage to contacts 331 of defrost timer 332. Timer 332 acts as a conventional defrost timer, providing periodic defrosting of evaporator tube 315 and its attached fins, typically every two hours, by energizing hot gas valve 17 through contacts 331. Some frost also tends to accumulate on ice-forming plate 3 while the icemaker is not operating but is also removed during these periodic defrostings. Defrost timer motor 333 runs continuously but, as described, contacts 331 are only energized at times when the icemaker is not functioning.

After operating for some time in the above described freezer space cooling, non-icemaking mode, the temperature in the freezer space may drop below the setting of thermostat 325. At that time contacts 327 and 328 open, compressor 9 and fan 257 are deactivated and all operation of the system ceases.

After remaining idle for some time, and with thermostat 325 remaining satisfied, the ice level in bin 18 may drop, due to usage or melting. At this time bin switch 21 closes, timer 15 and relay 334 are energized, and compressor 9 is energized through contacts 335. Also pump 14 again circulates water over ice-forming plate 3, and icemaking is resumed. However, with the temperature in freezer space 291 below the set point of thermostat 325, contacts 328 remain open and fan 257 does not run. This prevents overcooling of the freezer and refrigerator spaces. Baffles 323 and 324 can be used to prevent convective airflow through fin assembly 322 at this time. With fan 257 thus deactivated during icemaking, the temperature at evaporator tube 315 becomes lower than at other icemaking times, thereby tending to cause a faster buildup of ice. To compensate for this, controller 308, described in detail in my co-pending patent application Ser. No. 07/864,781, controls the speed of motor 313 in timer 15. In this present embodiment, bulb 307 is attached directly to evaporator tube 315 so that a positive compensation can be effected.

An arrangement that is an alternative to de-activating fan 257 to control of the temperature in the refrigerator space is now described. The contacts 328 of thermostat 325 can be bypassed and deleted so that fan 257 runs continuously except during defrost and ice harvest. A bimetal actuator 260a, sensitive to the temperature in refrigerator space 292, can be used to actuate damper 260b and thus control the flow of cold air through opening 260 to the refrigerator space. In this manner overcooling of the refrigerator space is prevented. Any incidental overcooling of freezer space 291 with such an arrangement is not detrimental to frozen foods stored within.

Another alternative arrangement that can be used with contacts 328 bypassed to prevent overcooling of the refrigerator space employs a freezestat connected electrically in series with fan 257 to sense the temperature of the refrigerator space. With the freezestat set at several degrees above 32° F., fan 257 is deenergized when necessary to prevent the unwanted freezing of food in the refrigerator space. Later, as the temperature in the refrigerator space rises, the freezestat closes and again allows fan 257 to run. Other alternative methods of controlling the temperature in refrigerator space 292 with fan 257 running continuously can be used, such as a secondary fan to propel the secondary air flow through opening 260, with a thermostat in refrigerator space 292 controlling this fan.

Figure 2:
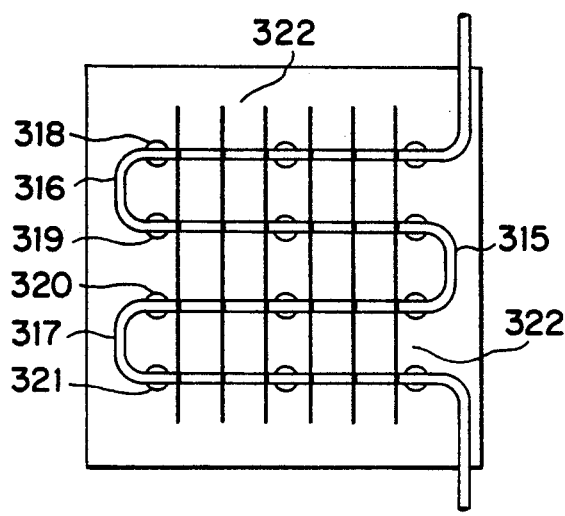
FIG. 2 is a rear view of the evaporator employed in the system of FIG. 1.

Referring to FIG. 2 of the accompanying drawings, a rear view of evaporator tube 315, also illustrated in FIG. 1, is shown, with return bends 316 and 317 visible. Conductor pieces 318, 319, 320 and 321 connect tube 315 to ice-forming plate 3. Additional similar conductor pieces are shown in this view. Fin assembly 322 is shown attached to tube 315 with additional fins showing in this view.

In this embodiment the evaporator is formed as a metal tube, with metal conductor pieces used to make contact between the evaporator and the ice-forming plate; however, an alternate arrangement can be provided by constructing the evaporator of pressed metal passages with formed protrusions providing a plurality of spaced contact areas with the ice-forming plate. This or any other suitable evaporator design with similar spaced contact areas can be used. Similarly with the fin assemblies shown attached to evaporator tube 315, one can utilize any other type of heat exchanger having a sufficiently large surface area in contact with the air circulating in the freezer space, and providing a sufficient thermal flow path through conducting metal structure for heat to flow from this surface area to the evaporator.

Figure 3:
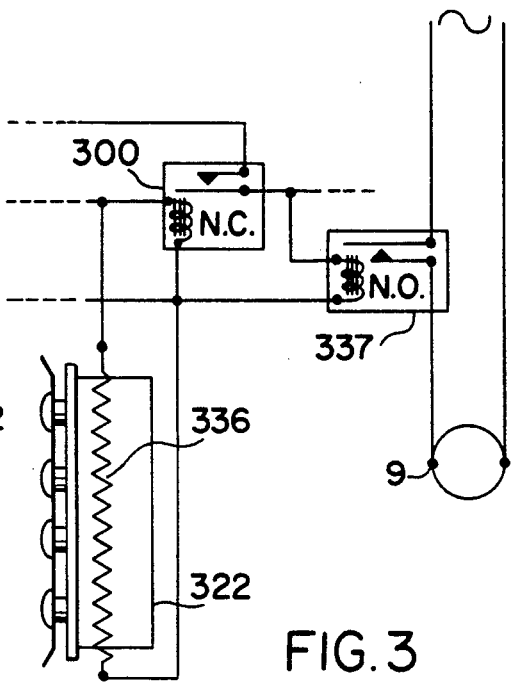
FIG. 3 is a schematic flow diagram of an alternative embodiment of the invention wherein an electric heating element is employed for defrosting.

The embodiment shown in FIG. 3 includes an alternative defrost method wherein an electric heating element 336 is employed to defrost fin assembly 322 and evaporator tube 315 instead of the method employing hot gas valve 17 described above in the embodiment of FIG. 1. This alternative embodiment is the same as the embodiment of FIG. 1 except that valve 17 and its associated piping are deleted and the electrical connections to valve 17 are connected to heating element 336. Also, since the compressor is not required to run during this method of defrosting, relay 337 is employed to de-activate compressor 9 during defrost. The coil of relay 337 is connected in series with the contacts of relay 300 which open when defrost is in operation. In this manner relay 337 interrupts current flow to the compressor during defrost.

Heating element 336 is typically a metal sheathed element of the type commonly used to defrost refrigeration coils, and can be mounted adjacent to, or attached to, fin assembly 322, or evaporator tube 315, in any suitable manner to transfer heat to them.

Figure 4:
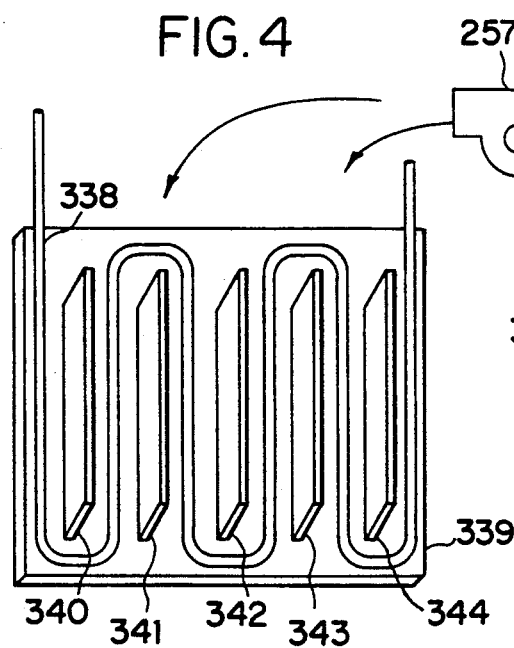
FIG. 4 is a rear view in perspective of an evaporator employed in an alternative embodiment of the invention.
Figure 5:
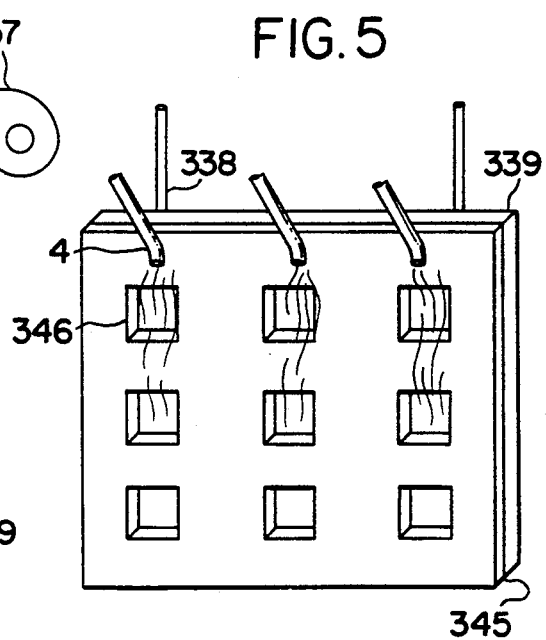
FIG. 5 is a front view in perspective of the evaporator employed in the system of FIG. 4.

An alternative embodiment, shown in FIGS. 4 and 5, has evaporator tube 338 contacting ice-forming plate 339 throughout its entire length rather than only at spaced points as shown in the embodiment of FIG. 2. The use of spaced contact points in the embodiments of FIGS. 1 and 2 is adopted as a means of forming separate pieces of ice on the ice-forming plate, which is constructed of relatively thin gage metal, to confine icemaking to areas close to the points of contact. In the present embodiment, other means are used to keep the forming ice pieces separate. FIG. 4 is a rear view of this embodiment and shows evaporator tube 338 in contact with ice-forming plate 339. Fins 340, 341, 342, 343 and 344 are attached directly to plate 339 which is constructed of relatively heavy metal to provide efficient heat flow from the air circulated in the freezer space by the fan to the fins, to plate 339 and then to evaporator plate 338. Alternatively, any other type of construction enabling adequate heat transfer from the circulating air to the evaporator can be used. Also, any other workable type of evaporator construction can be used.

FIG. 5 is a front view of ice-forming plate 339. The front surface of plate 339 is contacted by mask 345 having an opening 346. Additionally, mask 345 has a plurality of other openings similar to opening 346, whereby isolated areas of the front surface of plate 339 are exposed through the openings. Mask 345 is constructed of plastic or any other material having a relatively low heat conductivity rate. In operation, with ice-forming plate 339 cooled by evaporator 338, and with water flowing downwards from nozzle 4, ice forms on the area of plate 339 exposed by opening 346; ice does not form on mask 345 itself because of its low conductivity. Ice forms similarly in all the mask openings. These mask openings can be beveled toward the open side of the mask so that the ice pieces can slide out easily during harvest. After the ice has formed to size, a harvest is initiated. The areas of plate 339 exposed by the mask openings can either be flat, concave or in the form of cavities. In this embodiment, and the other embodiments of this application, a plurality of nozzles similar to nozzle 4 can be used; alternatively, water can be propelled in jet streams to individual ice-forming areas.

Except for the differences in the construction of ice-forming plate 339, evaporator tube 338, mask 345 and fins 340, 341, 342, 343 and 344, the embodiment of FIGS. 4 and 5 is the same as the embodiment of FIG. 1. Defrost and ice harvest functions can be performed in the same manner as the embodiment of FIG. 1, or the defrost and harvest function described with the embodiment of FIG. 3 can be used by applying heat from an electric heating element to ice forming plate 339 or evaporator tube 338, as shown in FIG. 3.

Having described preferred embodiments of a new and improved household refrigerator with combination icemaker and water purifier constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined in the appended claims.

What is claimed is:

1. A system for storage of foodstuffs at temperatures less than 45° F., and for providing ice and purified water comprising:
   a continuous refrigerant flow path including a compressor, a condenser, a metering means and an evaporator means;
   a storage space for food;
   fan means for cooling said storage space by conducting thermal energy from said storage space to said evaporator means;
   temperature sensor means for sensing the temperature in said storage space;
   control means responsive to said temperature sensor means for energizing said compressor and said fan means when the temperature in said storage space is higher than a first predetermined level;
   at least one ice-forming surface;
   means for cooling selected areas of said ice-forming surface to a temperature below the freezing temperature of water by conducting thermal energy to said evaporator means from said selected areas;
   pump means for circulating a stream of unpurified water over said selected areas to form ice at said selected areas while washing impurities away from the formed ice with said stream;
   means for increasing the temperature at said selected areas at various times to remove said ice from said ice-forming surface;
   a bin for collecting ice removed from said ice-forming surface;
   means for warming said bin to melt some of the ice collected therein into purified liquid water;
   container means for collecting the purified liquid water formed by melting the ice in said bin;
   bin sensor means for sensing the amount of ice collected in said bin;
   container sensor means for sensing the amount of purified liquid water collected in said container;
   control means responsive to said bin sensor means for deactivating said pump means when said amount of said collected ice in said bin exceeds a first predetermined amount;
   control means responsive to said bin sensor means for activating said pump means when said amount of said collected ice in said bin becomes less than said first predetermined amount; and
   control means responsive to both said temperature sensor means and said bin sensor for de-energizing said compressor when the temperature in said storage space is less than said first predetermined level and the amount of said collected ice in said bin exceeds said first predetermined amount, said control means further including means for re-energizing said compressor in response to either or both of the following conditions: (1) the temperature in the said storage space exceeds a second predetermined level; and (2) the amount of said collected ice in the said bin falling below said first predetermined amount.

2. The system according to claim 1 wherein said means for warming said bin includes heating means for selectively heating the bottom of said bin;
   control means responsive to the said container sensor means for energizing said heating means when the said amount of said purified water in said container is less than a predetermined amount;
   control means responsive to the said container sensor means for de-energizing said heating means when the said amount of said purified water in said container exceeds said predetermined amount.

3. The system according to claim 1 further comprising control means responsive to said temperature sensor means for de-energizing said fan means in response to the temperature in said storage space becoming lower than said first predetermined level, said control means further including means for re-energizing said fan means in response to the temperature in said storage space exceeding said second predetermined level.

4. The system according to claim 1 wherein said storage space is divided into a refrigerator space maintained at a temperature above 32° F., and a freezer space maintained at a temperature below 32° F.

5. The system according to claim 4, further comprising means for conducting a flow of air from said freezer space to said refrigerator space.

6. The system according to claim 5, further comprising means for reducing the said flow of air when the temperature in the said refrigerator space is lower than a third predetermined level.

* * * * *